United States Patent [19]

Togai et al.

[11] Patent Number: 4,985,837
[45] Date of Patent: Jan. 15, 1991

[54] TRACTION CONTROL APPARATUS

[75] Inventors: Kazuhide Togai, Takatsuki; Makoto Shimada, Kyoto, both of Japan

[73] Assignee: Mitsubishi Jidosha Kogyo Kabushiki Kaisha, Tokyo, Japan

[21] Appl. No.: 383,794

[22] Filed: Jul. 21, 1989

[30] Foreign Application Priority Data

Jul. 27, 1988 [JP] Japan .............................. 63-98375[U]
Jun. 28, 1989 [JP] Japan .................................. 1-164108

[51] Int. Cl.$^5$ ............................................. B60K 31/00
[52] U.S. Cl. ................................ 364/426.02; 180/197
[58] Field of Search .................. 364/426.01, 426.02, 364/426.03; 180/197; 303/95, 96, 103

[56] References Cited

U.S. PATENT DOCUMENTS

| | | | |
|---|---|---|---|
| 3,938,611 | 2/1976 | Bertolasi | 364/426.03 |
| 4,703,823 | 11/1987 | Yogo et al. | 364/426.03 |
| 4,736,814 | 4/1988 | Yogo et al. | 180/197 |
| 4,811,808 | 3/1989 | Matsumoto et al. | 180/197 |
| 4,843,552 | 6/1989 | Inagaki | 364/426.03 |
| 4,866,618 | 9/1989 | Tamura et al. | 180/197 |
| 4,884,651 | 12/1989 | Harada et al. | 180/197 |

FOREIGN PATENT DOCUMENTS

| | | |
|---|---|---|
| 0186122 | 7/1986 | European Pat. Off. |
| 0254943 | 2/1988 | European Pat. Off. |
| 0310270 | 4/1989 | European Pat. Off. |
| 0321931 | 6/1989 | European Pat. Off. |

*Primary Examiner*—Gary Chin
*Attorney, Agent, or Firm*—Hedman, Gibson, Costigan & Haore

[57] ABSTRACT

A driving wheel rotational speed and a driven wheel rotational speed are detected by corresponding wheel speed sensors to calculate a slip value DV of driving wheels. A target output torque of an engine of a vehicle is calculated on the basis of the slip value DV. A target intake air amount per a predetermined number of revolutions of the engine is set in accordance with the target torque. Opening correction of a throttle valve is performed at every control cycle time Δt on the basis of an difference between a target intake air amount per the predetermined number of revolutions of the engine and an actual intake air amount per the predetermined number of revolutions of the engine in the controller. The opening of the throttle valve is increased/decreased in accordance with the opening correction value Δθti by the motor drive circuit.

14 Claims, 13 Drawing Sheets

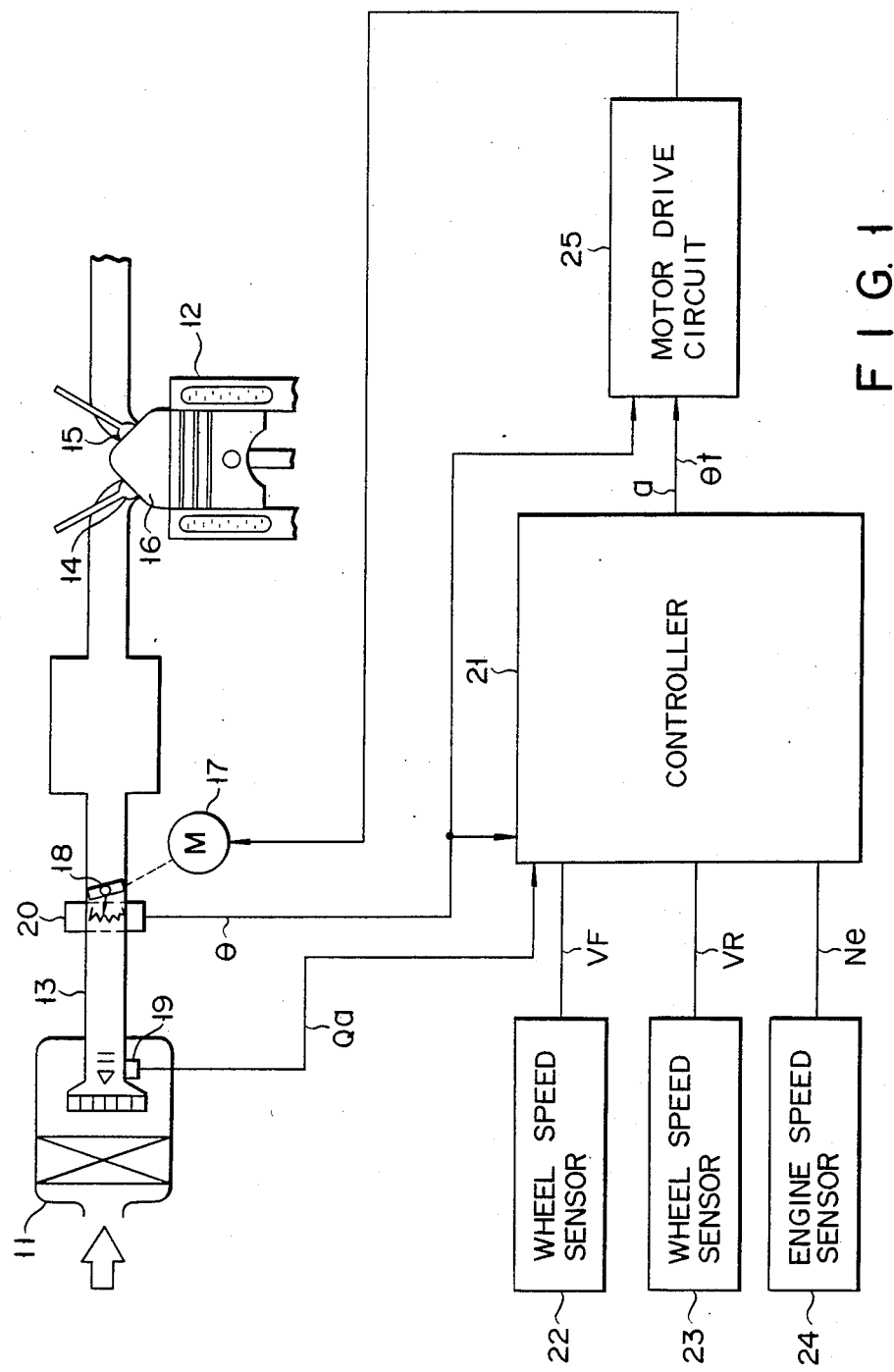
F I G. 1

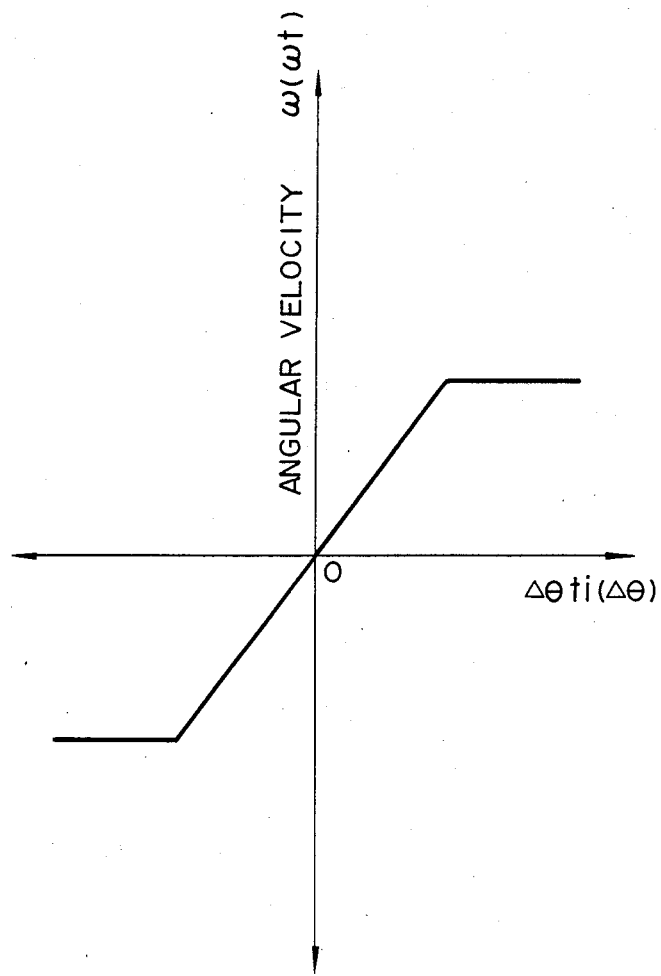
F I G. 3

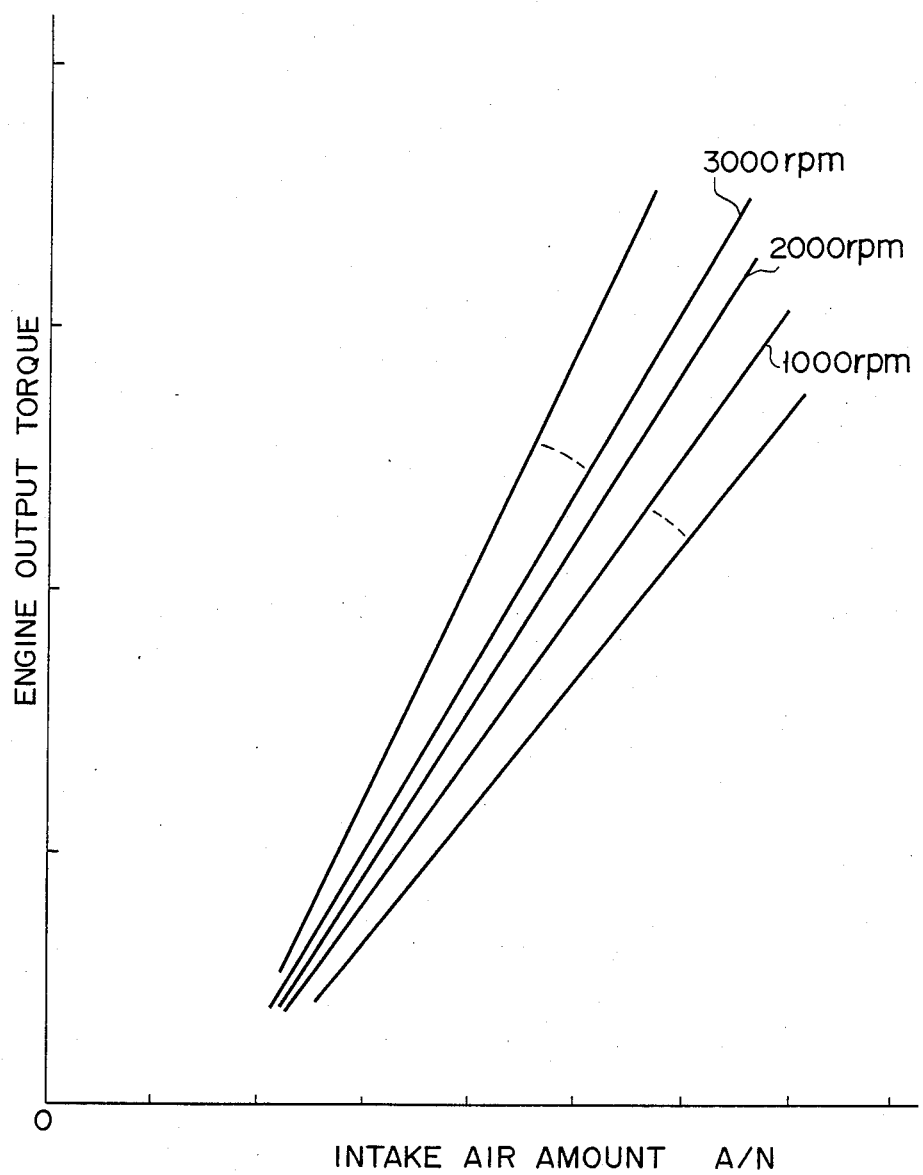
F I G. 5

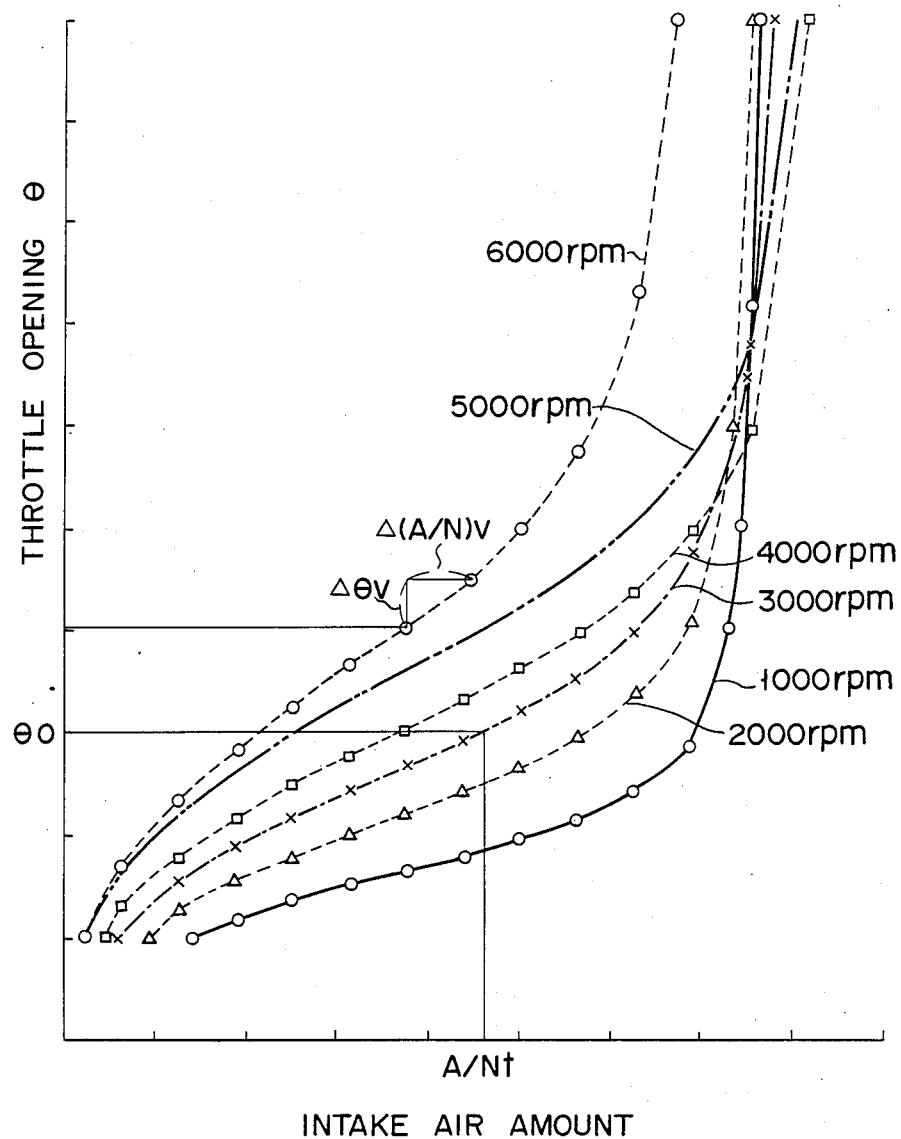
F I G. 7

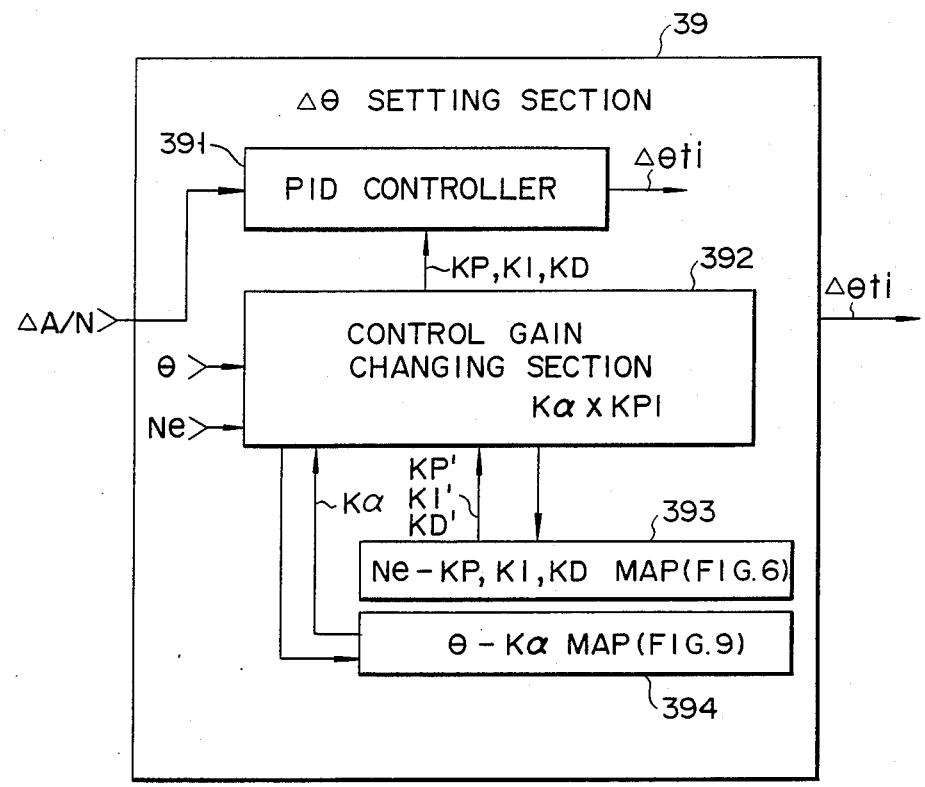
F I G. 8
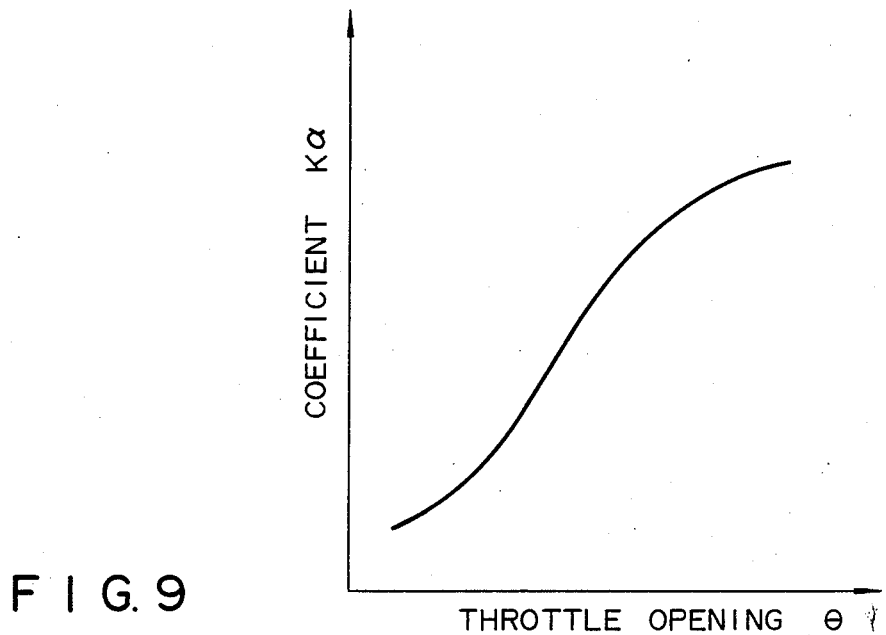
F I G. 9

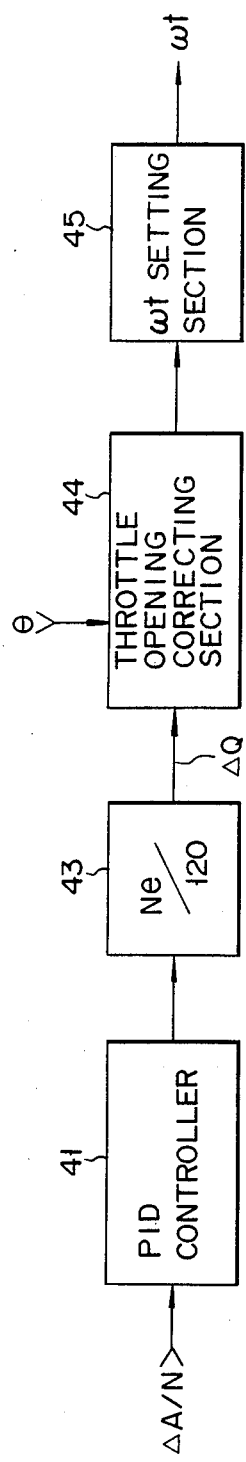
F I G. 12B
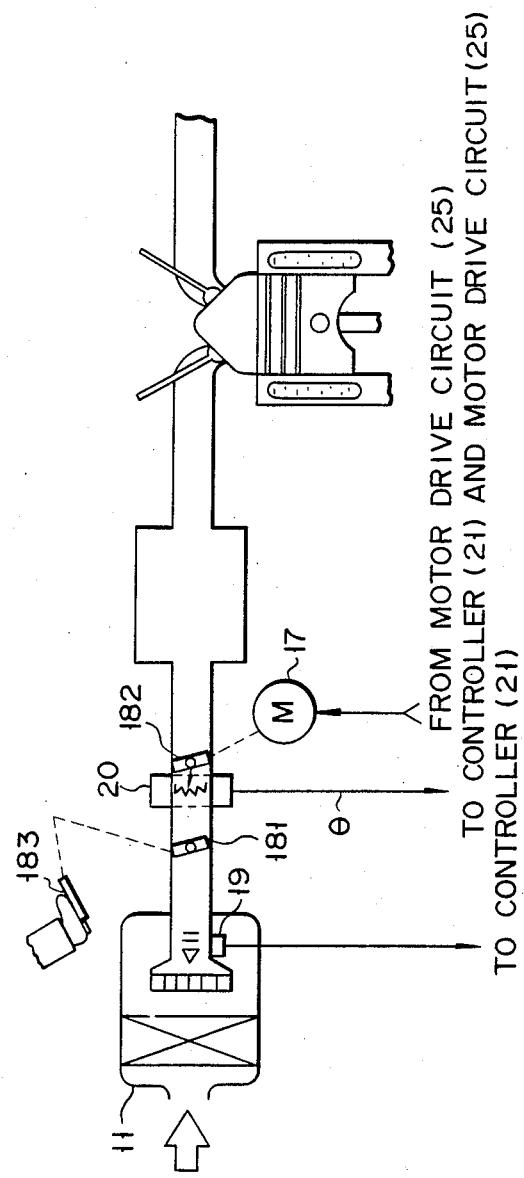
F I G. 13

TRACTION CONTROL APPARATUS

BACKGROUND OF THE INVENTION

1. Field of the Invention

The present invention relates to a traction control apparatus for, when a slip of driving wheels is detected, reducing an engine output to suppress the slip of the driving wheels.

2. Description of the Related Art

When a vehicle is started or is traveling, if an accelerator pedal is rapidly treadled, a slip of driving wheels occurs. The slip is caused such that an engine output is immediately increased upon rapid treadle of the accelerator pedal, and a driving torque exceeding a transmissible force determined by a coefficient of friction between the driving wheels and a road surface is generated in the driving wheels. In this manner, when the slip of the driving wheels occurs, travel stability is impaired.

SUMMARY OF THE INVENTION

It is an object of the present invention to provide a traction control apparatus which can prevent a slip of driving wheels occurring when a vehicle is started or is accelerated.

According to the present invention, there is provided a traction control apparatus comprising driving wheel speed detecting means for detecting a driving wheel rotational speed of a vehicle, travel speed detecting means for detecting a travel speed of the vehicle, slip detecting means for detecting a slip of driving wheels on the basis of a difference between an output from the driving wheel speed detecting means and an output from the travel speed detecting means, target output torque setting means for setting a target output torque of an engine of the vehicle on the basis of an output from the slip detecting means, target intake air amount setting means for setting a target intake air amount per a predetermined number of revolutions of the engine in accordance with the target torque set by the target output torque setting means, a throttle valve for adjusting an air amount taken into the engine, engine speed detecting means for detecting an engine speed of the engine, intake air amount detecting means for detecting an intake air amount per the predetermined number of revolutions of the engine actually taken into the engine, throttle opening correction value setting means for setting an opening correction value of the throttle valve on the basis of a difference between the target intake air amount set by the target intake air amount setting means and the actual intake air amount detected by the intake air amount detecting means, target throttle opening setting means for setting a target opening of the throttle valve on the basis of the throttle opening correction value set by the throttle opening correction value setting means, and throttle valve driving means for opening/ closing the throttle valve in accordance with the target opening set by the target throttle opening setting means.

According to the present invention, an opening of a throttle valve is corrected at every control cycle time $\Delta t$ on the basis of a difference between a target intake air amount per the predetermined number of revolutions of an engine and an actually measured intake air amount per unit revolution of the engine, thus providing the following effects.

(1) In an engine with a turbo charger or supercharger, which is pressure-charged at an upstream side of a throttle valve, an engine output can be appropriately controlled.

(2) In an apparatus for changing an engine output by air amount control other than a throttle valve, e.g., variable valve timing control, appropriate engine control can be performed.

(3) In an apparatus for controlling an engine output using a plurality of throttle valves including a throttle valve interlocked with an accelerator pedal and a sub throttle valve which is not interlocked with the accelerator pedal, appropriate engine control can be performed.

BRIEF DESCRIPTION OF THE DRAWING

FIG. 1 is a block diagram showing an overall arrangement of a traction control apparatus according to a first embodiment of the present invention;

FIG. 3 is a map showing the relationship between an opening correction value $\Delta \theta ti$ and a motor rotational angular velocity $\omega$;

FIG. 5 is a map showing the relationship between an intake air amount and an engine output torque when an engine speed Ne is used as a parameter;

FIG. 7 is a map showing the relationship between an intake air amount A/N per cycle of an engine and a throttle opening $\theta$ when the engine speed Ne is used as a parameter;

FIG. 8 is a block diagram showing a modification of a $\Delta \theta$ setting section;

FIG. 9 is a map showing the relationship between the throttle opening $\theta$ and a correction coefficient K$\alpha$;

FIGS. 12A and 12B are block diagrams showing functional blocks of a controller shown in FIG. 11; and FIG. 13 is a block diagram showing a modification of a traction control apparatus according to the first and second embodiments.

DETAILED DESCRIPTION OF THE PREFERRED EMBODIMENTS

Figure 2A:
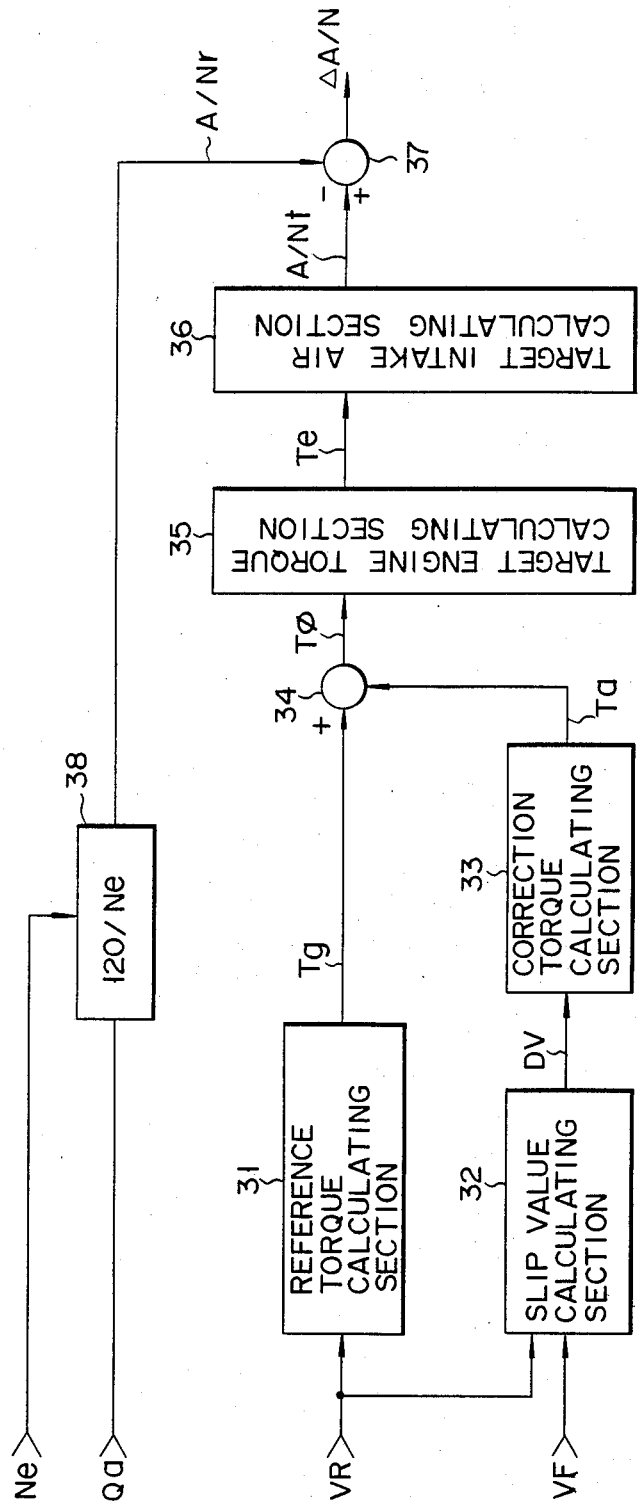
FIGS. 2A and 2B are block diagrams showing function blocks of a controller shown in FIG. 1.

A traction control apparatus according to a first embodiment of the present invention will now be described with reference to the accompanying drawings. FIG. 1 shows the overall arrangement of the traction control apparatus. A vehicle in this embodiment means front-drive vehicle. In FIG. 1, reference numeral 11 denotes an air cleaner. The air cleaner 11 is connected to one end of an intake pipe 13 for supplying intake air to an engine 12. In the engine 12, reference numeral 14 denotes an intake valve; 15, an exhaust valve; and 16, a combustion chamber.

In the intake pipe 13, a throttle valve 18 whose opening is controlled by a motor 17 comprising, e.g., a stepping motor, is disposed.

A Kármán vortex type airflow sensor 19 is arranged in the air cleaner 11. The airflow sensor 19 measures an intake air amount Qa per unit time (e.g., per second)

supplied to the engine 12. Reference numeral 20 denotes a throttle opening sensor for detecting an opening of the throttle valve 18, i.e., a throttle opening θ. The throttle opening sensor 20 comprises, e.g., a potentiometer. The outputs of the airflow sensor 19 and the throttle opening sensor 20 are connected to a controller 21 for controlling to suppress a slip of driving wheels. The controller 21 comprises, e.g., a microcomputer, and includes a memory, an arithmetic unit, a register, and the like.

Reference numeral 22 denotes a wheel speed sensor for detecting a rotational speed VF of driving wheels of a vehicle; 23, a wheel speed sensor for detecting a rotational speed VR of driven wheels of the vehicle; and 24, an engine speed sensor for detecting an engine speed Ne of the engine 12. The outputs of the wheel speed sensors 22 and 23 and the engine speed sensor 24 are connected to the controller 21. The output of the controller 21 is connected to a motor drive circuit 25 through a control line a. Note that the motor drive circuit 25 is connected to the output of the throttle opening sensor 20. The output of the motor drive circuit 25 is connected to the motor 17.

Figure 2B:
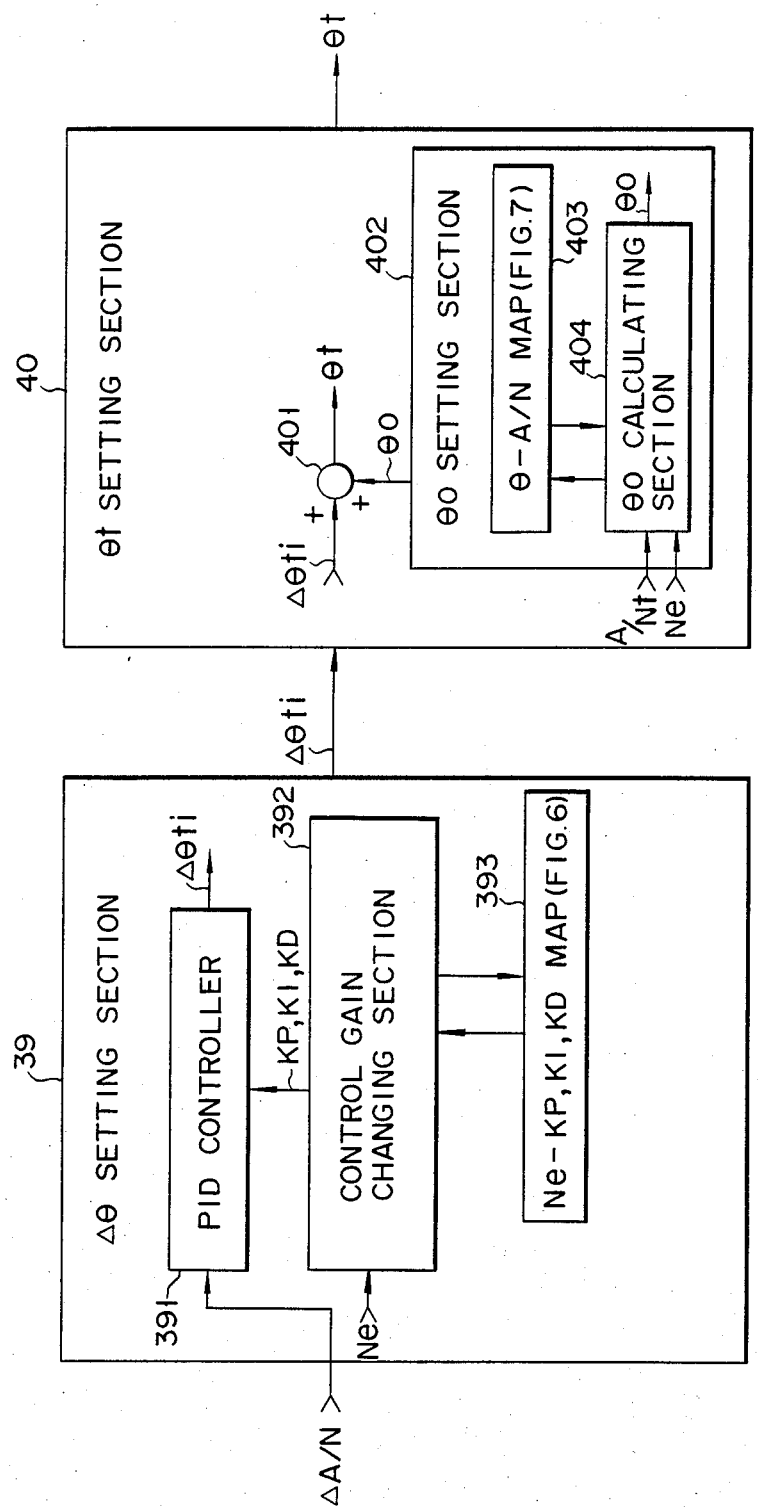

The detailed arrangement of the controller 21 shown in FIG. 1 will be described below with reference to FIGS. 2A and 2B. The output of the wheel speed sensor 23 is connected to a reference torque calculating section 31 and to a slip value calculating section 32. And the wheel speed sensor 22 is connected to the slip value calculating section 32. The reference torque calculating section 31 calculates a reference torque Tg which can be transmitted to a road surface, on the basis of a vehicle acceleration GB obtained from the driven wheel speed VR. The reference torque Tg is calculated by Tg=GB ×W ×Re (where W is the vehicle weight and Re is the radius of a wheel). The slip value calculating section 32 calculates a slip value DV (=VF−VR) on the basis of the driving wheel speed VF and the driven wheel speed VR. The slip value calculating section 32 is connected to a correction torque calculating section 33. In the correction torque calculating section 33, a proportional value and an integral value corresponding to the slip value DV are appropriately combined and calculated to obtain a correction torque Ta.

The reference torque calculating section 31 is connected to the "+" terminal of a subtractor 34, and the correction torque calculating section 33 is connected to the "−" terminal of the subtractor 34. In the subtractor 34, the correction torque Ta is subtracted from the reference torque Tg, thus calculating a target drive shaft output torque Tφ as a target value of a torque at a drive shaft. The subtractor 34 is connected to a target engine torque calculating section 35. The target engine torque calculating section 35 divides the target drive shaft output torque Tφ with a transmission ratio of a transmission or the like to calculate a target engine torque Te as an engine output. The target engine torque calculating section 35 is connected to a target intake air calculating section 36. The target intake air calculating section 36 calculates an intake air amount A/Nt per a predetermined number of revolutions of the engine necessary for generating the target engine torque Te, e.g., per cycle of the engine. The target intake air calculating section 36 is connected to the "+" terminal of a subtractor 37.

Since one cycle is an operation cycle until one cylinder of the engine completes intake, compression, combustion, and exhaust strokes, the intake air amount per cycle of the engine means an intake air amount taken into the engine 12 until one operation cycle is completed. Therefore, in a four-stroke-cycle engine, since the engine revolves twice until one operation cycle is completed, an intake air amount per cycle of the engine means an air amount taken into the engine 12 upon every two revolutions of the engine.

The intake air amount Qa per unit time detected by the airflow sensor 19 and the engine speed Ne detected by the engine speed sensor 24 are input to a multiplying section 38. The multiplying section 38 multiplies the intake air amount Qa per unit time with "120/Ne" to calculate an intake air amount A/Nr per cycle of the engine by an actual measurement.

The meaning of "120/Ne" multiplied in the multiplying section 38 will be described below. Since the intake air amount Qa measured by the airflow sensor 19 is an intake air amount per second, it is multiplied with 60 to calculate an intake air amount (60Qa) per minute. As described above, since two revolutions of the engine correspond to one cycle, the number of operation cycles of the engine which revolves Ne times per minute is (Ne/2). Therefore, the intake air amount per cycle of the engine is given by 60Qa/(Ne/2), i.e., a product of (120/Ne) and the intake air amount Qa. The intake air amount A/Nr is input to "−" terminal of the subtractor 37. The subtractor 37 calculates an intake air amount difference ΔA/N=A/Nt−A/Nr.

The intake air amount difference ΔA/N is input to a Δθ setting section 39. The Δθ setting section 39 calculates an opening correction value Δθti of the throttle valve 18 necessary for eliminating the intake air amount difference ΔA/N by PID control. More specifically, the intake air amount difference ΔA/N is input to a PID controller 391 in the Δθ setting section 39. The PID controller 391 calculates the opening correction value Δθti of the throttle valve 18 necessary for eliminating the intake air difference ΔA/N at every predetermined control cycle time Δt. The PID controller 391 is connected to a control gain changing section 392. The control gain changing section 392 determines control gains KP, KI, and KD used for PID control performed in the PID controller 391 on the basis of the intake air amount ΔA/N, and outputs them to the PID controller 391. The control gain changing section 392 is connected to an Ne-KP,KI,KD map 393 shown in FIG. 6, and receives the engine speed Ne output from the engine speed sensor 24.

The output of the Δθ setting section 39 is connected to a θt setting section 40. The θt setting section 40 sets a target throttle opening θt of the throttle valve 18. The opening correction value Δθti is input to one "+" terminal of an adder 401 in the θt setting section 40. The other "+" terminal of the adder 401 receives a reference opening θ0 output from a θ0 setting section 402. The reference opening θ0 is an opening serving as a reference used when the throttle valve 18 is driven by the opening correction value Δθti. The 74 0 setting section 402 is constituted by a θ-A/N map 403 representing the relationship between the opening θ of the throttle valve 18 and the intake air amount A/N per cycle of the engine 12 using the engine speed Ne as a parameter, as shown in FIG. 7, and a θ0 calculating section 404 for receiving the target intake air amount A/Nt per cycle of the engine set by the target intake air calculating section 36 and the engine speed Ne output from the engine speed sensor 24 and outputting a corresponding throttle opening as the reference opening θ0 by referring to the map 403 based on the target intake air amount A/Nt and the engine speed Ne.

The output of the controller 21 is connected to the motor drive circuit 25 through the control line a. The motor drive circuit 25 stores a map set with a limit value of an angular velocity ω of the motor 17 with respect to the opening correction value Δθti, as shown in FIG. 3, and sets a drive amount and drive speed of the motor 17 in correspondence with the opening correction value Δθti. The output of the motor drive circuit 25 is connected to the motor 17. The motor drive circuit 25 controls so that the opening of the throttle valve 18 becomes equal to the target throttle opening θt (=θ0+Δθ).

Figure 4:
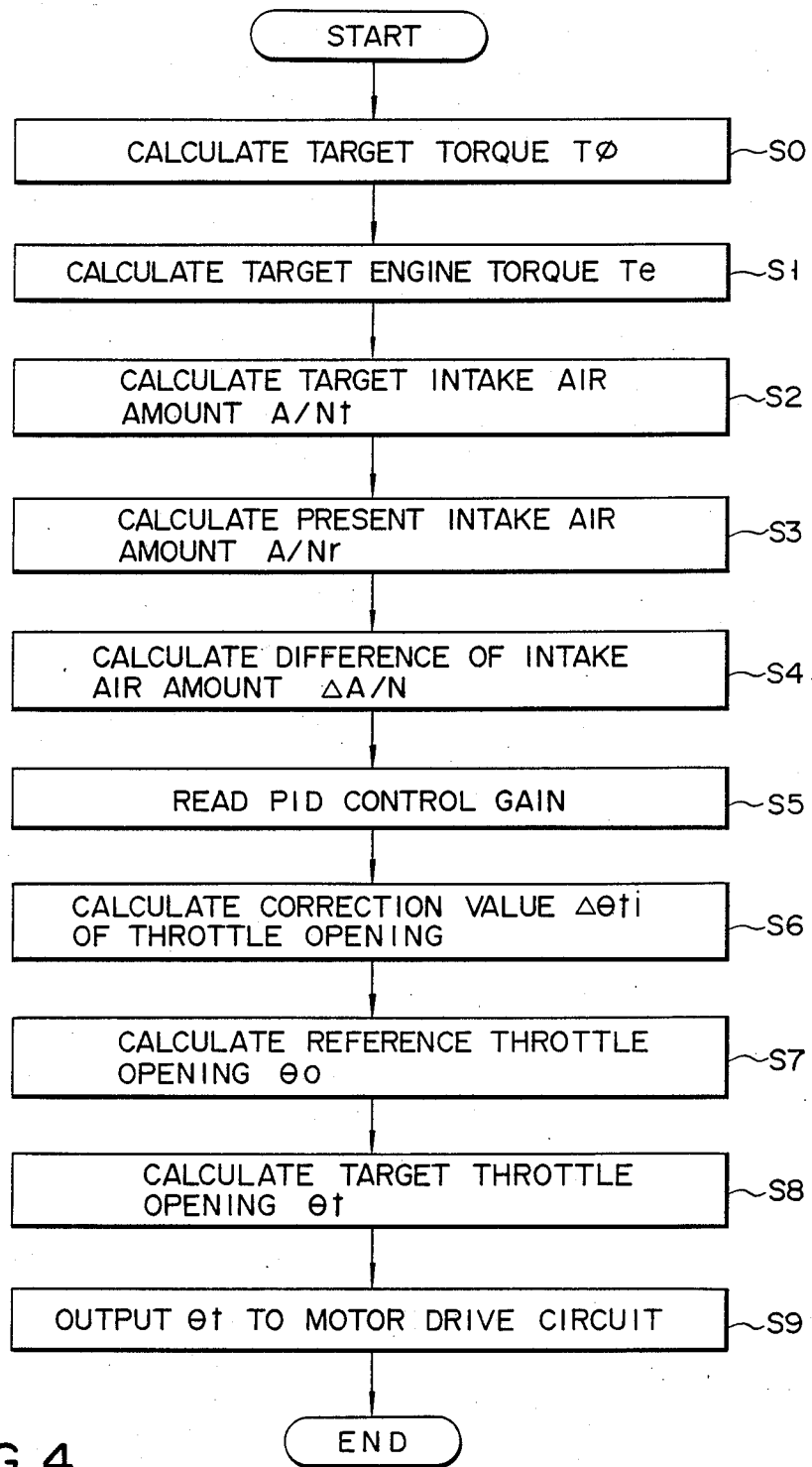
FIG. 4 is a flow chart for explaining the operation of the first embodiment of the present invention.

The operation of the first embodiment of the present invention with the above arrangement will be described below with reference to the flow chart of FIG. 4. The driving wheel speed VF detected by the wheel speed sensor 22 and the driven wheel speed VR detected by the wheel speed sensor 23 are input to the slip value calculating section 32, thus calculating the slip value DV (=VF−VR) of the driving wheels. The driven wheel speed VR detected by the wheel speed sensor 23 is also sent to the reference torque calculating section 31 to obtain a differential value of the driven wheel speed VR, i.e., the vehicle acceleration GB. The reference torque Tg (=GB×W×Re) which can be transmitted to a road surface is calculated based on the vehicle acceleration GB. The slip value DV calculated by the slip value calculating section 32 is supplied to the correction torque calculating section 33, and proportional and integral values corresponding to the slip value DV are appropriately combined to calculate the correction torque Ta. The correction torque Ta means a torque to be reduced for suppressing the slip value DV. If the correction torque Ta is large, this means that a considerable slip is occurring. The subtractor 34 then subtracts the correction torque Ta from the reference torque Tg to calculate a target torque Tφ as a target value of a torque at the drive shaft (step S0). More specifically, if the correction torque Ta is large, this means that the driving wheel slip is considerable, and a small target torque Tφ is calculated.

The target torque Tφ is supplied to the target engine torque calculating section 35 to calculate the target engine torque Te for producing the target torque Tφ (step S1). The target engine torque Te is supplied to the target intake air calculating section 36. The target intake air calculating section 36 refers to the map shown in FIG. 5 to calculate the target intake air amount A/Nt per cycle of the engine for producing the target engine torque Te (step S2). The intake air amount Qa per unit time detected by the airflow sensor 19 is multiplied with 120/Ne in the multiplying section 38 to calculate the present intake air amount A/Nr per cycle of the engine (step S3). The subtractor 37 calculates the air amount difference ΔA/N between the target intake air amount A/Nt per cycle of the engine and the present intake air amount A/Nr per cycle of the engine. That is, the air amount difference per cycle of the engine ΔA/N = A/Nt−A/Nr is calculated (step S4). The difference ΔA/N is supplied to the PID controller 391 in the Δθ setting section 39, and the opening correction value Δθti of the throttle valve 18 necessary for eliminating the difference ΔA/N is calculated (step S6). The opening correction value Δθti is calculated at every predetermined control cycle time Δt on the basis of the following equation:

$$\Delta\theta ti = KP(Ne)\Delta A/Ni + KI(Ne)S_{A/Ni} + KD(Ne)(\Delta A/Ni - \Delta A/N(i-1))$$

where Δθti is the throttle opening correction value in a present control cycle i, $$S_{A/Ni} = S_{A/N(i-1)} + \Delta A/Ni.$$

Figure 6:
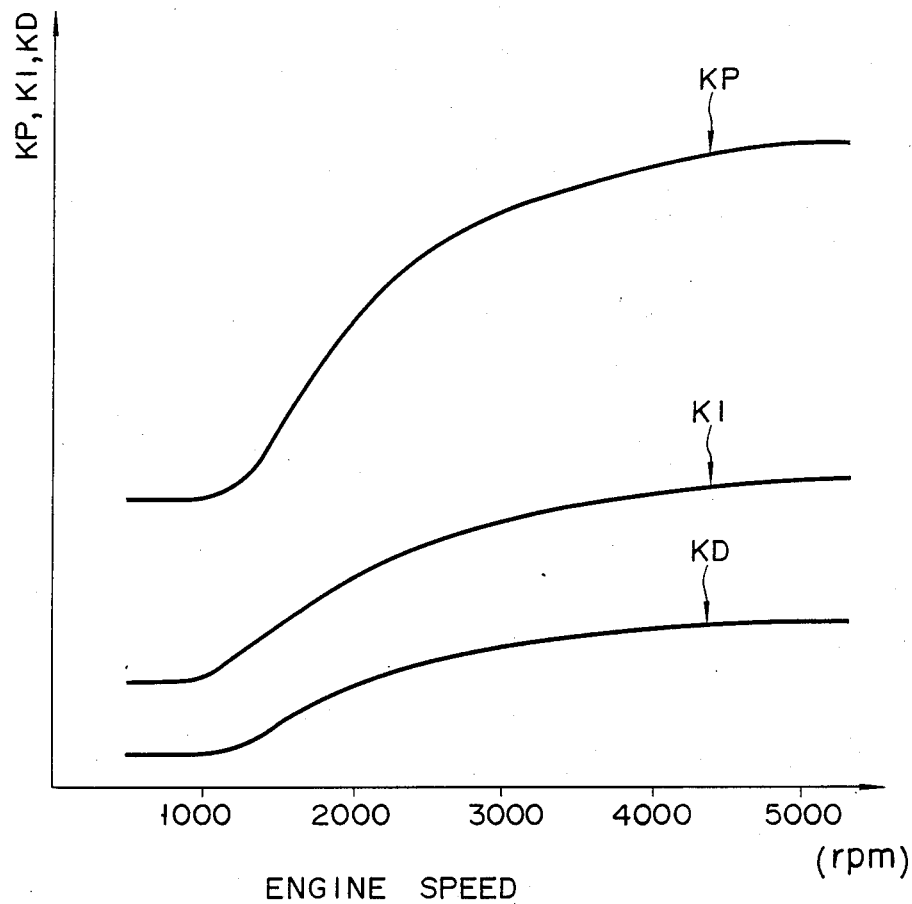
FIG. 6 is a map showing the relationship between control gains KP, KI, and KD and the engine speed Ne.

ΔA/Ni is the air amount difference ΔA/N in the present control cycle i,

ΔA/N(i−1) is the air amount difference ΔA/N in the immediately preceding control cycle i−1, $S_{A/Ni}$ is the sum of air amount differences ΔA/N up to the present control cycle i, $S_{A/N(i-1)}$ is the sum of air amount differences ΔA/N up to the immediately preceding control cycle i−1, and KP, KI, and KD are respectively the proportional, integral, and differential gains set by the control gain changing section 392 before the calculation in step S6, and are read out from the Ne-KP,KI,KD map 393 which is set in accordance with the engine speed Ne as shown in FIG. 6 (step S5). In the PID controller 391, the opening correction value Δθti is calculated based on the air amount difference ΔA/N. As shown in FIG. 6, the proportional, integral, and differential gains KP, KI, and KD are increased as the engine speed Ne is increased. As the engine speed Ne is increased, a change in intake air amount per cycle of the engine upon a change in throttle opening θ is smaller. For this reason, as the engine speed Ne is increased, the proportional, integral, and differential gains KP, KI, and KD are increased, so that precision of the opening correction value Δθti can be improved.

The opening correction value Δθti is supplied to the θt setting section 40. The θ0 setting section 402 refers to the map shown in FIG. 7 to calculate the reference opening θ0 for generally obtaining the target intake air amount A/Nt per cycle of the engine (step S7). The opening correction amount Δθti is added to the reference throttle opening θ0 by the adder 401, thus calculating the target throttle opening θt of the throttle valve 18 (step S8). The target throttle opening θt is supplied to the motor drive circuit 25. The motor drive circuit 25 controls rotation of the motor 17, so that the throttle opening detected by the throttle opening sensor 20 reaches the target throttle opening θt (step S9). When the throttle valve 18 is pivoted, the motor drive circuit 25 limits the angular velocity ω when the motor 17 is rotated in accordance with the opening correction value Δθti, as shown in FIG. 3. In this manner, when the opening correction value Δθti falls within a predetermine range, the angular velocity ω is defined in proportion to the opening correction value Δθti. Therefore, as the opening correction value Δθti approaches zero, a change in opening of the throttle valve 18 becomes slow, the opening of the throttle valve 18 is increased/decreased in accordance with the opening correction value Δθti corresponding to the intake air amount difference ΔA/N, and a change in engine torque becomes smooth. When the opening correction value Δθti exceeds the predetermined range, the angular velocity ω is limited to a given value, thus preventing an engine torque from being rapidly changed upon a rapid change in throttle opening. Intake air whose flow rate is controlled by the throttle valve 18 is mixed with a fuel injected from an injection valve (not shown) provided in front of the intake valve 14, and the mixture is then supplied to the combustion chamber 16. As a result, a torque according to the target torque Tt is output. As described above, when the output from the subtractor 37 becomes "0", i.e., when the intake air amount difference $\Delta A/N$ becomes "0", processing for pivoting the throttle valve 18 is completed.

FIG. 8 shows a modification of the $\Delta\theta$ setting section 39. The intake air amount difference $\Delta A/N$ output from the subtractor 37 is output to the PID controller 391 as shown in FIG. 8. The PID controller 391 is connected to the control gain changing section 392. The control gain changing section 392 is connected to the Ne-KP,KI,KD map corresponding to the engine speed Ne as shown in FIG. 6, and is also connected to a $\theta$-K$\alpha$ map 394 corresponding to the throttle opening $\theta$, as shown in FIG. 9. The section 392 receives the engine speed Ne output from the engine speed sensor 24 and the throttle opening $\theta$ detected by the throttle opening sensor 20. More specifically, the control gain changing section 392 refers to the map shown in FIG. 6 to calculate KP', KI', and KD' as proportional, integral, and differential gains according to the engine speed Ne. Furthermore, the control gain changing section 392 refers to the map shown in FIG. 9 to calculate a correction coefficient K$\alpha$ corresponding to the throttle opening $\theta$. The proportional, integral, and differential gains KP', KI', and KD' are respectively multiplied with the correction coefficient K$\alpha$ to calculate the proportional, integral, and differential gains KP, KI, and KD. These gains are output to the PID controller 391. More specifically, the proportional, integral, and differential gains KP, KI, and KD are set to be increased in accordance with increases in engine speed Ne and throttle opening $\theta$. The correction coefficient K$\alpha$ is set to be increased as the throttle opening $\theta$ is increased, as shown in FIG. 9. This setting is made since a change in intake air amount per cycle of the engine upon a change in throttle opening $\theta$ is smaller as the throttle opening $\theta$ is increased. For this reason, as the throttle opening $\theta$ is increased, the proportional, integral, and differential gains KP, KI, and KD are increased to increase the opening correction value $\Delta\theta$ti, so that a change in intake air amount required can always be obtained with high precision. More specifically, in this modification, since the proportional, integral, and differential gains KP, KI, and KD are changed to proper values in accordance with the engine speed Ne and the throttle opening $\theta$, optimal PID control can be realized even if the engine speed Ne and the throttle opening $\theta$ are changed. Note that the correction coefficient K$\alpha$ is multiplied with the proportional, integral, and differential gains KP', KI', and KD' to calculate the gains KP, KI, and KD. However, the correction coefficient K$\alpha$ may be added to the proportional, integral, and differential gains KP', KI', and KD' to calculate the gains KP, KI, and KD.

Figure 10:
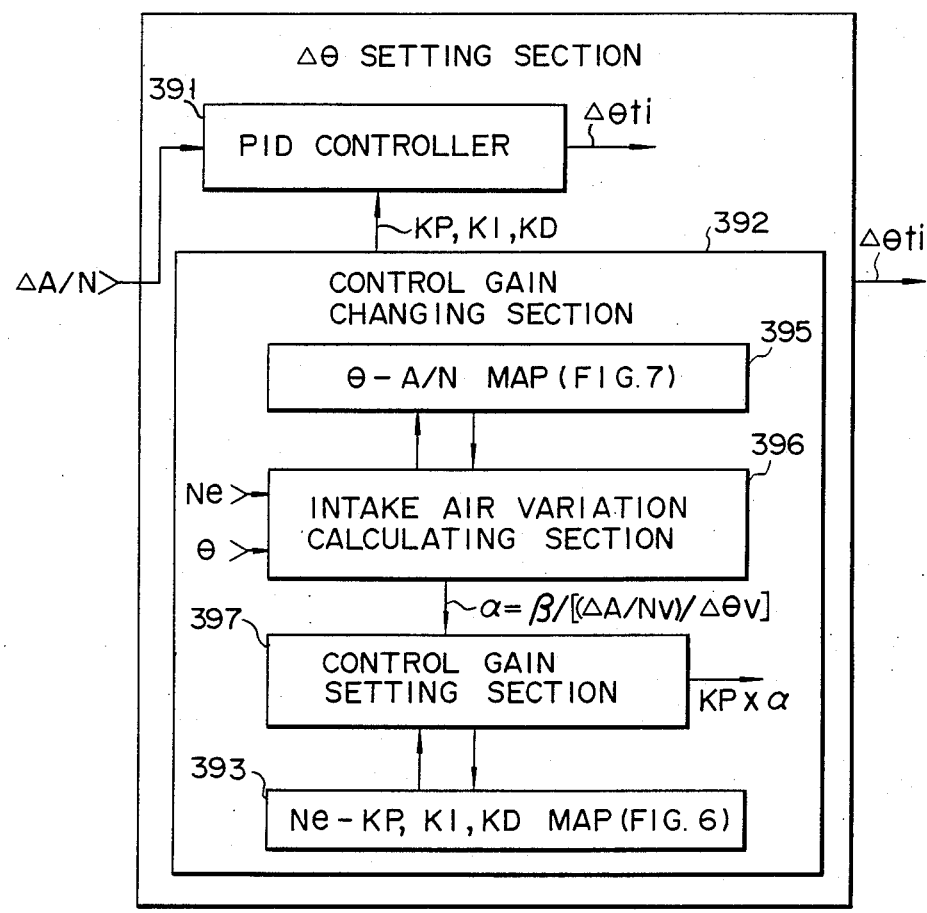
FIG. 10 is a block diagram showing another modification of the $\Delta \theta$ setting section.

FIG. 10 shows another modification of the $\Delta\theta$ setting section 39. The intake air amount difference $\Delta A/N$ output from the subtractor 37 is input to the PID controller 391 in FIG. 10. The PID controller 391 is connected to the control gain changing section 392. The control gain changing section 392 is constituted by a $\theta$-A/N map 395 representing the relationship between the opening $\theta$ of the throttle valve 18 and the intake air amount A/N per cycle of the engine using the engine speed as a parameter, as shown in FIG. 7, an intake air variation calculating section 396 for calculating a variation in intake air amount A/N per cycle of the engine corresponding to a variation in throttle opening near the throttle opening $\theta$ detected by the throttle opening sensor 20 on the basis of data stored in the map 395, a control gain setting section 397 for decreasing the control gains KP, KI, and KD at an identical engine speed as a variation in intake air amount A/N calculated by the intake air variation calculating section 396 is larger, and the Ne-KP,KI,KD map 393 shown in FIG. 6 connected to the control gain setting section 397. More specifically, the intake air variation calculating section 396 refers to the map shown in FIG. 7 to calculate a variation $\Delta A/Nv$ of the intake air amount A/N per cycle of the engine corresponding to a throttle opening variation $\Delta\theta v$ near the throttle opening $\theta$ detected by the throttle opening sensor 20, and calculate the ratio of the variation $\Delta A/Nv$ to $\Delta\theta v$, i.e., $(\Delta A/Nv)/\Delta\theta v$. The intake air variation calculating section 396 outputs a correction coefficient $\alpha = \beta/[(\Delta A/Nv)/\Delta\theta v]$ to the control gain setting section 397 ($\beta$ is a constant). The control gain setting section 397 refers to the map shown in FIG. 6 to calculate proportional, integral, and differential gains which change in accordance with the engine speed Ne as KP', KI', and KD'. The proportional, integral, and differential gains are respectively multiplied with the correction coefficient $\alpha$, thus calculating a proportional gain KP ($=\alpha \times$KP'), an integral gain KI ($=\alpha \times$KI'), and a differential gain KD ($=\alpha \times$KD'). These gains are output to the PID controller 391. The correction coefficient $\alpha$ is set to be a larger value as $(\Delta A/Nv)/\Delta\theta v$ becomes smaller. The larger the throttle opening $\theta$ in a region, the smaller the change in intake air amount per cycle of the engine at an identical change in throttle opening. Thus, as the change in intake air amount with respect to the identical change in throttle opening is larger, the control gains are decreased, so that the throttle opening correction value $\Delta\theta$ti corresponding to the necessary change in intake air amount is always precisely calculated. In this modification, since the proportional, integral, and differential gains KP, KI, and KD are changed to proper values in accordance with the variation in intake air amount upon changes in engine speed Ne and throttle opening $\theta$, optimal PID control can be realized even if the engine speed Ne and the throttle opening $\theta$ are changed. Note that the correction coefficient $\alpha$ is multiplied with the proportional, integral, and differential gains KP', KI', and KD' to calculate the gains KP, KI, and KD. However, the correction coefficient $\alpha$ may be added to the proportional, integral, and differential gains KP', KI', and KD' to calculate the gains KP, KI, and KD.

The correction coefficient $\alpha$ need not be set as a proportional value of a reciprocal number of $(\Delta A/Nv)/\Delta\theta v$ like in this modification. For example, a value which decreases along with an increase in $(\Delta A/Nv)/\Delta\theta v$ may be preset in a map, so that a value read out by the intake air variation calculating section 396 according to $(\Delta A/Nv)/\Delta\theta v$ may be set as the correction coefficient $\alpha$. More specifically, when the correction coefficient $\alpha$ is set according to a formula or map, the correction coefficient $\alpha$ need be decreased as $(\Delta A/Nv)/\Delta\theta v$ is increased.

Note that in the two modifications, products or sums of the control gains and correction coefficient K$\alpha$ or $\alpha$ in correspondence with the engine speed Ne and the throttle opening $\theta$ may be set as a map.

The control gains may be changed in accordance with only the throttle opening $\theta$ without changing them according to the engine speed Ne. Alternatively, the control gains may be changed in accordance with only a variation in intake air amount with respect to a change in throttle opening $\theta$, i.e., $(\Delta A/Nv)/\Delta\theta v$.

In the first embodiment, the $\theta 0$ calculating section 404 may output a value corresponding to a closed state of the throttle valve 18 as a reference opening. At least one of the proportional, integral, and differential gains KP, KI, and KD output from the control gain changing section 392 may be changed.

Figure 11:
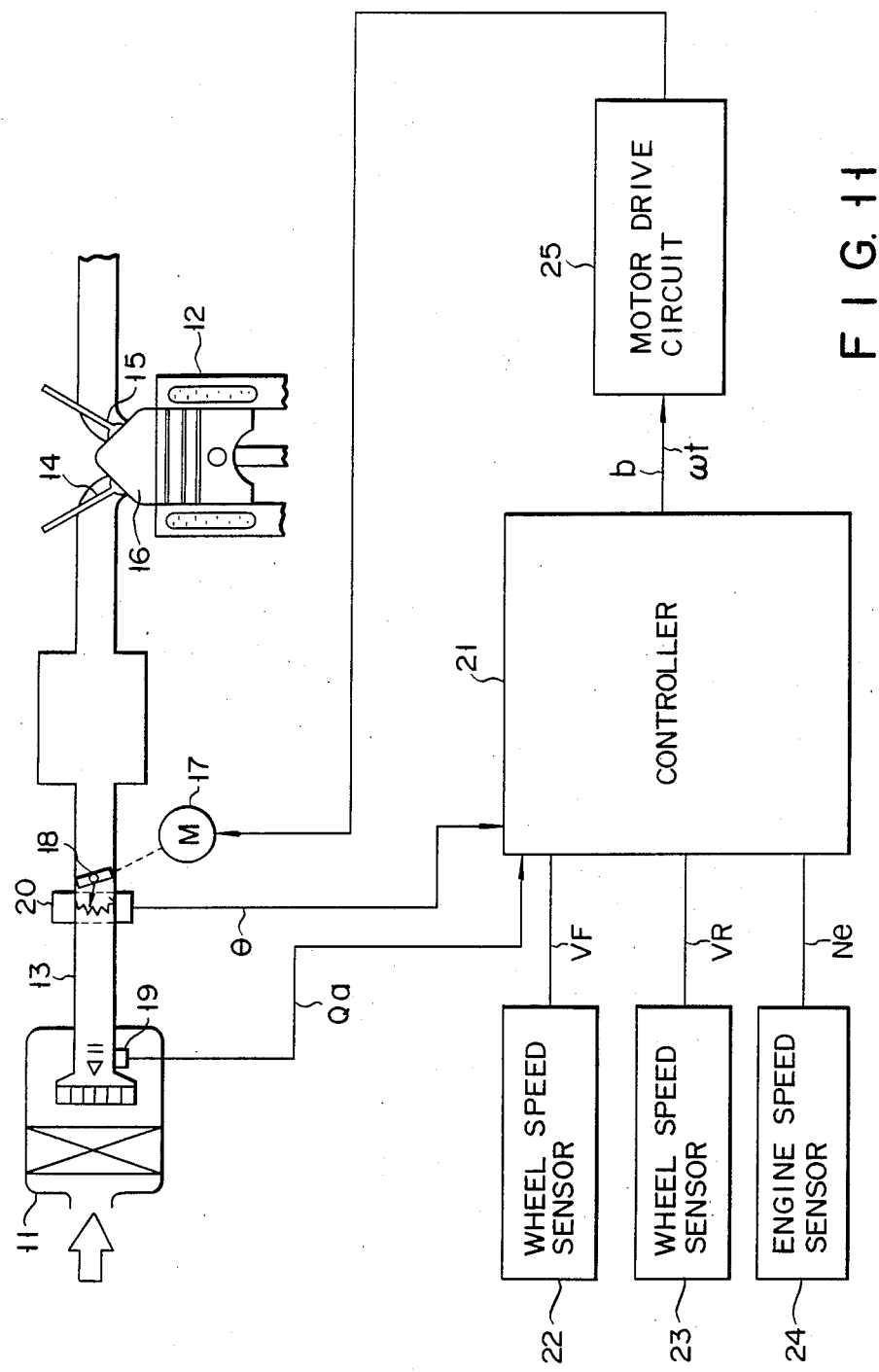
FIG. 11 is a block diagram showing an overall arrangement of a traction control apparatus according to a second embodiment of the present invention.
Figure 12A:
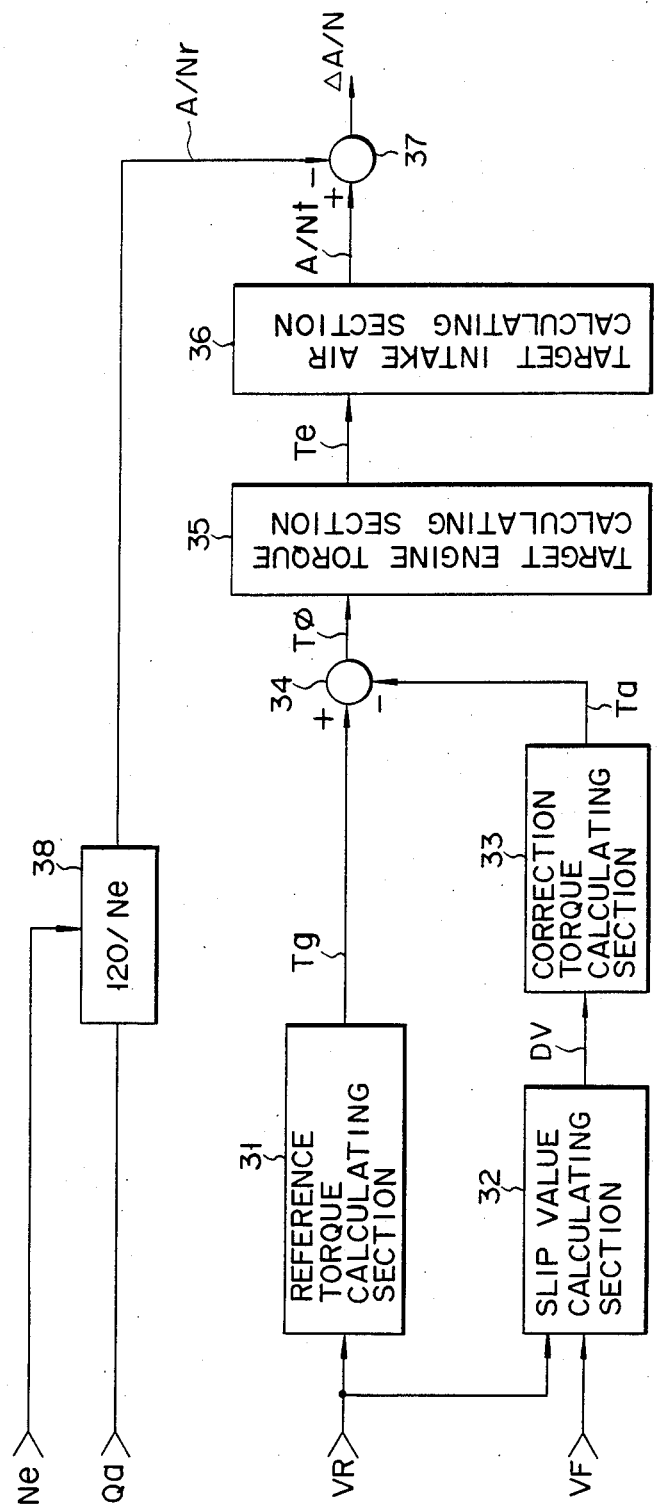

A second embodiment of the present invention will now be described with reference to FIG. 11 and FIGS. 12A and 12B. FIG. 11 shows the overall arrangement of the traction control apparatus, and FIGS. 12A and 12B show functional blocks of the controller 21 shown in FIG. 11. The same reference numerals in FIG. 11 denote the same parts as in FIG. 1, and a detailed description thereof will be omitted. The arrangement in FIG. 11 is substantially the same as that in FIG. 1, except that an output from the throttle opening sensor 20 is input to only the controller 21, and a signal output from the controller 21 to the motor drive circuit 25 is a target angular velocity $\omega t$.

The detailed arrangement of the controller 21 will be described below with reference to FIGS. 12A and 12B. The arrangement of FIG. 12A is the same as that shown in FIG. 2A, and its description will be omitted. The intake air amount difference $\Delta A/N = A/Nt - A/Nr$ calculated by the subtractor 37 is input to a PID controller 41. The PID controller 41 performs PID control based on the intake air amount difference $\Delta A/N$, and calculates a control value corresponding to the intake air amount difference $\Delta A/N$ per cycle of the engine. The output of the PID controller 41 is connected to a multiplying section 43. In the multiplying section 43, the control value is multiplied with "Ne/120" to be converted to a control valve according to a correction intake air flow rate $\Delta Q$ per unit time. As has been described above, this multiplication is made to convert the control value into one per unit time since $\Delta A/N$ is a value per cycle of the engine and the corresponding control valve is also a value per cycle of the engine. The output of the multiplying section 43 is connected to a throttle opening correcting section 44. The throttle opening correcting section 44 receives the opening signal $\theta$ output from the throttle opening sensor 20 for detecting the opening (throttle opening) $\theta$ of the throttle valve 18 arranged on the downstream side of the air cleaner 11. The throttle opening correcting section 44 multiplies the output from the section 43 with a reciprocal number of $\partial Q/\partial\theta$ at the actual throttle opening at that time, thus calculating the throttle opening correction value $\Delta\theta$ corresponding to the control valve according to the correction intake air flow rate $\Delta Q$. In this case, $\partial Q/\partial\theta$ means a change in intake air amount when the throttle valve 18 is pivoted by a unit angle (e.g., 1°). $\partial Q/\partial\theta$ is set to be a smaller value as the opening of the throttle valve 18 is larger. Therefore, when a throttle opening is changed by a value corresponding to an identical intake air flow rate $\Delta Q$, since a change in an intake air amount upon a change in throttle opening $\theta$ is small in a region with a large throttle opening $\theta$, the throttle opening correction value $\Delta\theta$ is corrected by the throttle opening correcting section 44 so that the reciprocal number of $\partial Q/\partial\theta$ is multiplied to increase a change in throttle opening. On the other hand, in a region with a small throttle opening $\theta$, since a change in an intake air amount upon a change in throttle opening $\theta$ is large, the throttle opening correction value $\Delta\theta$ is corrected to decrease a change in throttle opening. The output of the throttle opening correcting section 44 is connected to a $\omega t$ (throttle angular velocity) setting section 45. The $\omega t$ setting section 45 refers to the map shown in FIG. 3 to calculate a target angular velocity $\omega t$ when the throttle valve 18 is pivoted to generate the throttle opening correction value $\Delta\theta$. The target angular velocity $\omega t$ is output to the motor drive circuit 25. The motor drive circuit 25 controls the rotation of the motor 17 in accordance with the target angular velocity $\omega t$, so that the angular velocity when the throttle valve 18 is pivoted is equal to the target angular velocity $\omega t$.

The operation of the second embodiment of the present invention with the above arrangement will be described below. The operation until the subtractor 37 outputs the intake air amount difference $\Delta A/N$ is the same as that described with reference to FIG. 2A in the first embodiment. The PID controller 41 then performs PID control on the basis of the difference $\Delta A/N$ to obtain a control value corresponding to the difference $\Delta A/N$.

The output from the PID controller 41 is multiplied with Ne/120 by the multiplying section 43, thus calculating a control value corresponding to the correction air flow rate $\Delta Q$ per unit time. Furthermore, the control value corresponding to the correction air flow rate $\Delta Q$ is multiplied with the reciprocal number of $\partial Q/\partial\theta$ corresponding to the present throttle opening in the throttle opening correcting section 44. Thus, when a throttle opening is changed by a value corresponding to an identical intake air flow rate $\Delta Q$, since a change in an intake air amount upon a change in throttle opening $\theta$ is small in a region with a large throttle opening $\theta$, the throttle opening correcting section corrects to increase a change in throttle opening. On the other hand, in a region with a small throttle opening $\theta$, since a change in an intake air amount upon a change in throttle opening $\theta$ is large, the section 44 corrects to decrease a change in throttle opening.

The throttle opening correction value $\Delta\theta$ output from the throttle opening correcting section 44 is sent to the $\omega t$ setting section 45 to calculate the target angular velocity $\omega t$ when the throttle valve 18 is pivoted to generate the throttle opening correction value $\Delta\theta$. As shown in FIG. 3, the target angular velocity $\omega t$ is set to be proportional to the throttle opening correction value $\Delta\theta$ when the throttle opening correction value $\Delta\theta$ falls within a predetermined range, and is set to be a constant value when the correction value $\Delta\theta$ exceeds the predetermined range. The target angular velocity $\omega t$ set by the $\omega t$ setting section 45 is supplied to the motor drive circuit 25. The motor drive circuit 25 controls the rotation of the motor 17 for controlling pivotal movement of the throttle valve 18. In this manner, since the angular velocity $\omega t$ is set to be proportional to the throttle opening correction value $\Delta\theta$ when the throttle opening correction value $\Delta\theta$ falls within the predetermined range, the pivot angular velocity of the throttle valve 18 is increased/decreased in accordance with the throttle opening correction value $\Delta\theta$ with respect to the variation $\Delta A/N$, and an engine torque is smoothly changed. When the throttle opening correction value $\Delta\theta$ exceeds the predetermined range, the target angular velocity $\omega t$ is limited to a constant value, thus preventing an engine torque from being rapidly changed upon an rapid change in throttle opening.

Intake air whose flow rate is controlled by the throttle valve 18 is mixed with a fuel injected from an injection valve (not shown) arranged in front of the intake valve 14, and the mixture is supplied to the combustion chamber 16. As a result, a torque according to the target torque Tt is output.

In the first and second embodiments, an engine in which one throttle valve is disposed in intake path has been exemplified. However, the present invention can be applied to an engine in which two throttle valves are disposed in an identical intake path, as shown in FIG. 13. In FIG. 13, reference numeral 18 denotes a main throttle valve which is opened/closed to be interlocked with an accelerator pedal 183; and 182, a sub throttle valve whose opening is controlled by the motor 17. In an engine having the two throttle valves, the target intake air amount A/Nt is obtained on the basis of the target engine torque Te obtained in the same manner as in the first and second embodiments. The proportional gain KP, the integral gain KI, and the differential gain KD of the PID controller 391 are changed in accordance with the opening of the throttle valve 182 as in the above embodiment, so that an opening correction value $\Delta\theta1$ of the sub throttle valve 182 can be obtained. More specifically, the sub throttle valve 182 can be controlled as the throttle valve 18 in the first or second embodiment. The opening correction value $\Delta\theta1$ is added to a reference opening $\theta10$ to calculate a target opening of the sub throttle valve 182, and the opening of the sub throttle valve 182 is controlled by a motor drive circuit 25. In this case, in a system wherein the sub throttle valve is caused to stand by at a full-open position when it is not controlled, the reference opening $\theta10$ can be set to be a value corresponding to a full-open state. Furthermore, the reference opening $\theta10$ can be set to be a predetermined opening other than the value corresponding to the full-open state.

What is claimed is:

1. A traction control apparatus comprising:
   driving wheel speed detecting means for detecting a driving wheel rotational speed of a vehicle;
   travel speed detecting means for detecting a travel speed of said vehicle;
   slip detecting means for detecting a slip of driving wheels on the basis of a difference between an output from said driving wheel speed detecting means and an output from said travel speed detecting means;
   target output torque setting means for setting a target engine output torque which reduces a drive torque in accordance with the slip detected by said slip detecting means;
   target intake air amount setting means for setting a target intake air amount per a predetermined number of revolutions of said engine in accordance with the target engine output torque set by said target output torque setting means;
   a throttle valve for adjusting an air amount taken into said engine;
   intake air amount detecting means for detecting an intake air amount per the predetermined number of revolutions of said engine actually taken into said engine;
   throttle opening correction value setting means for setting an opening correction value of said throttle valve on the basis of a difference between the target intake air amount set by said target intake air amount setting means and the actual intake air amount detected by said intake air amount detecting means;
   target throttle opening setting means for setting a target opening of said throttle valve on the basis of the throttle opening correction value set by said throttle opening correction value setting means; and
   throttle valve driving means for opening/closing said throttle valve in accordance with the target opening set by said target throttle opening setting means.

2. An apparatus according to claim 1, wherein said throttle valve is a sub throttle valve disposed in an intake path where a main throttle valve, which is coupled to an accelerator pedal of said vehicle and is opened/closed to be interlocked with said accelerator pedal to adjust said air amount taken into said engine, is disposed.

3. An apparatus according to claim 1, wherein said throttle opening correction value setting means comprises a conversion control means for performing conversion control for converting the difference between the target intake air amount set by said target intake air amount setting means and the actual intake air amount detected by said intake air amount detecting means into the opening correction value of said throttle valve, and a control gain changing means for changing a control gain of said conversion control means in accordance with an engine speed detected by an engine speed detecting means.

4. An apparatus according to claim 1 further comprising a throttle opening detecting means for detecting a present opening of said throttle valve, wherein said throttle opening correction value setting means comprises a conversion control means for performing conversion control for converting the difference between the target intake air amount set by said target intake air amount setting means and the actual intake air amount detected by said intake air amount detecting means into the opening correction value of said throttle valve, and a control gain changing means for changing a control gain of said conversion control means in accordance with the detection result of said throttle opening detecting section.

5. An apparatus according to claim 4, wherein said control gain changing means sets the larger control gain as the throttle opening detected by said throttle opening detecting means is larger.

6. An apparatus according to claim 4, wherein said control gain changing means comprises a data storage means for prestoring data representing a relationship between the throttle opening and the intake air amount per the predetermined number of revolutions of said engine, an intake air variation calculating means for calculating a variation in the amount of air intake per the predetermined number of revolutions of said engine corresponding to a predetermined throttle opening variation around the throttle opening detected by said throttle opening detecting means based on said relationship stored in said data storage means, and a control gain setting means for setting the smaller control gain as the variation in intake air amount obtained by said intake air variation calculating means is larger.

7. An apparatus according to claim 6, wherein said data storage means stores the data in correspondence with engine speeds, and said intake air variation calculating means calculates the variation in the amount of air intake per the predetermined number of revolutions of said engine corresponding to a predetermined throttle opening variation around the throttle opening detected by said throttle opening detecting means and an engine speed detected by an engine speed detecting means on the basis of said relationship stored in said data storage means.

8. An apparatus according to claim 6, wherein said control gain setting means comprises an engine speed correspondence control gain setting means for setting the control gain in accordance with an engine speed detected by an engine speed detecting means, and an intake air amount correspondence control gain setting means for changing the control gain set by said engine speed correspondence control gain setting means in accordance with the variation of intake air amount obtained by said intake air variation calculating means, so that the control gain at an identical engine speed is set to be a smaller value as the variation is larger.

9. An apparatus according to claim 4. wherein said conversion control means obtains the opening correction value of said throttle valve on the basis of a proportional value obtained by multiplying a first predetermined coefficient with the difference between the target intake air amount set by said target intake air amount setting means and the actual intake air amount detected by said intake air amount detecting means, a value obtained by multiplying a second predetermined coefficient with an integral value of the difference, and a value obtained by multiplying a third predetermined coefficient with a differential value of the difference, and said control gain changing means changes the control gain by changing at least one of said first, second, and third predetermined coefficients.

10. An apparatus according to claim 1, wherein said target throttle opening setting means comprises a reference opening setting means for setting a predetermined reference opening, and an adding means for adding the reference opening set by said reference opening setting means to the opening correction value set by said throttle opening correction value setting means to calculate the target opening of said throttle valve.

11. An apparatus according to claim 10, wherein said reference opening setting means sets an opening corresponding to a full-closed state of said throttle valve as a reference opening.

12. An apparatus according to claim 10, wherein said reference opening setting means comprises a data storage means for prestoring data representing a relationship between the opening of said throttle valve and the intake air amount per the predetermined number of revolutions of said engine, and an opening calculating means for setting an opening of said throttle valve corresponding to the target intake air amount set by said target intake air amount setting means as the reference opening on the basis of the data stored in said data storage means.

13. An apparatus according to claim 12, wherein said data storage means stores the data in correspondence with said engine speed, and said opening calculating means sets the opening of said throttle valve corresponding to an engine speed detected by an engine speed detecting means and the target air amount set by said target intake air amount setting means as the reference opening on the basis of the data stored in said data storage means.

14. An apparatus according to claim 1, wherein said travel speed detecting means detects a driven wheel rotational speed of said vehicle as the travel speed of said vehicle.

* * * * *